March 6, 1928.  
G. G. MORIN  
1,661,955  
SEMIAUTOMATIC TRIP FOR POWER SHOVELS  
Filed April 7, 1926  3 Sheets-Sheet 1
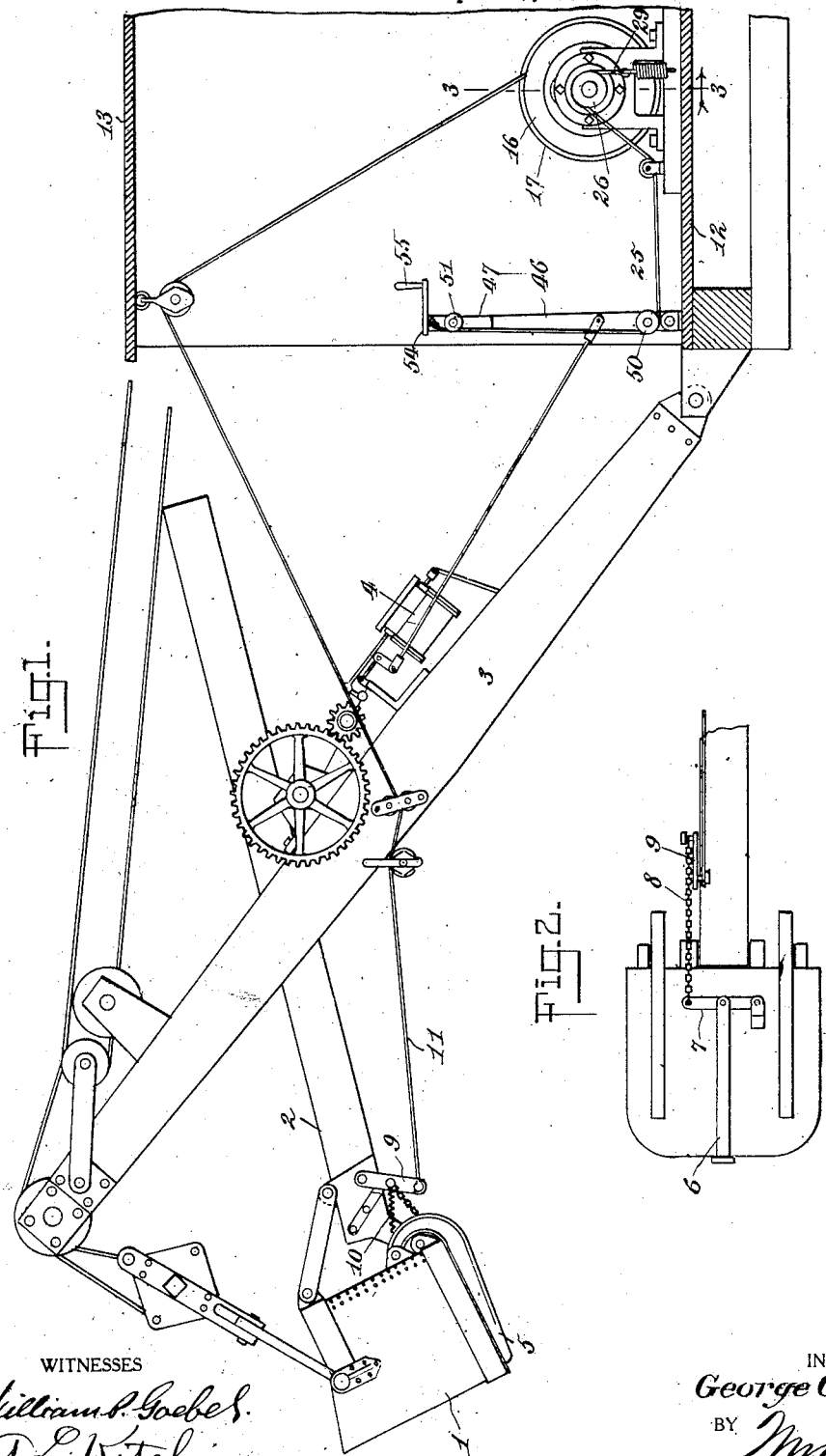
INVENTOR  
George G. Morin  
BY  
ATTORNEYS
WITNESSES March 6, 1928. 1,661,955
G. G. MORIN
SEMIAUTOMATIC TRIP FOR POWER SHOVELS
Filed April 7, 1926  3 Sheets-Sheet 2

WITNESSES

INVENTOR
George G. Morin
BY
ATTORNEYS

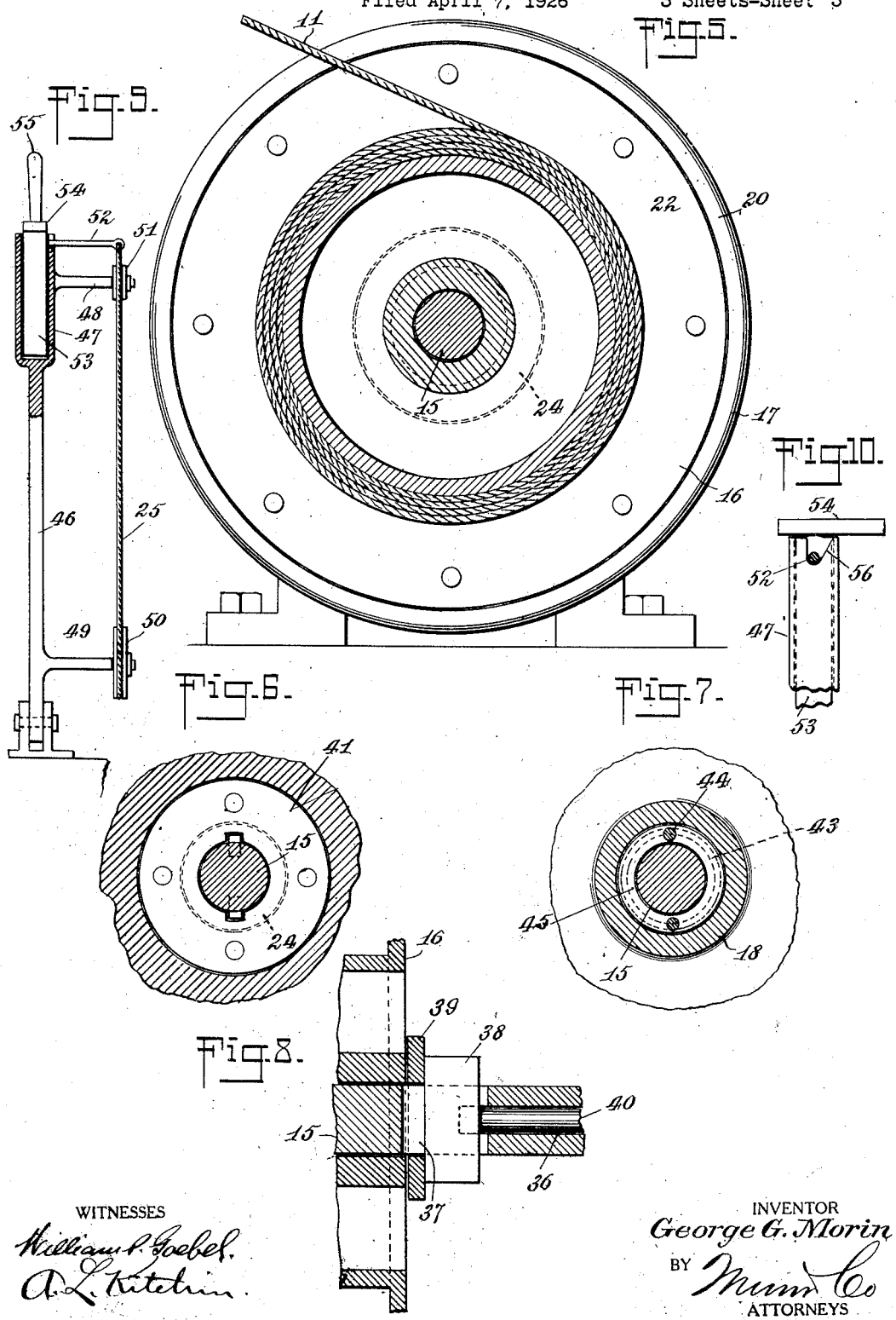

Patented Mar. 6, 1928.

1,661,955

UNITED STATES PATENT OFFICE.

GEORGE G. MORIN, OF HOLYOKE, MASSACHUSETTS.

SEMIAUTOMATIC TRIP FOR POWER SHOVELS.

Application filed April 7, 1926. Serial No. 100,410.

This invention relates to semi-automatic trips for power shovels and has for an object to provide an improved simplified construction for operating the trip mechanism by steam, gasoline or other actuated power members.

Another object of the invention is to provide a semi-automatic trip mechanism for power shovels wherein a constant rotating friction member is utilized and means for connecting the same to a drum for causing a quick movement of the trip mechanism of the power shovel.

A still further object of the invention is to provide in an automatic trip for power shovels a tripping drum and means for actuating the same which may utilize a constant moving power member.

In the accompanying drawings—

Figure 1 is a fragmentary view showing in outline a power shovel together with an embodiment of the invention.

Figure 2 is a bottom plan view of the shovel and certain associated parts.

Figure 5 is a sectional view through Figure 3 on line 5—5.

Figure 6 is a fragmentary sectional view through Figure 3 on line 6—6.

Figure 7 is a fragmentary sectional view through Figure 3 on line 7—7.

Figure 8 is a detail fragmentary sectional view through Figure 3 on line 8—8.

Figure 9 is an enlarged detail elevation with certain parts in section showing a control lever embodying certain features of the invention.

Figure 10 is a side view of the upper part of the lever structure shown in Figure 9.

Figure 3:
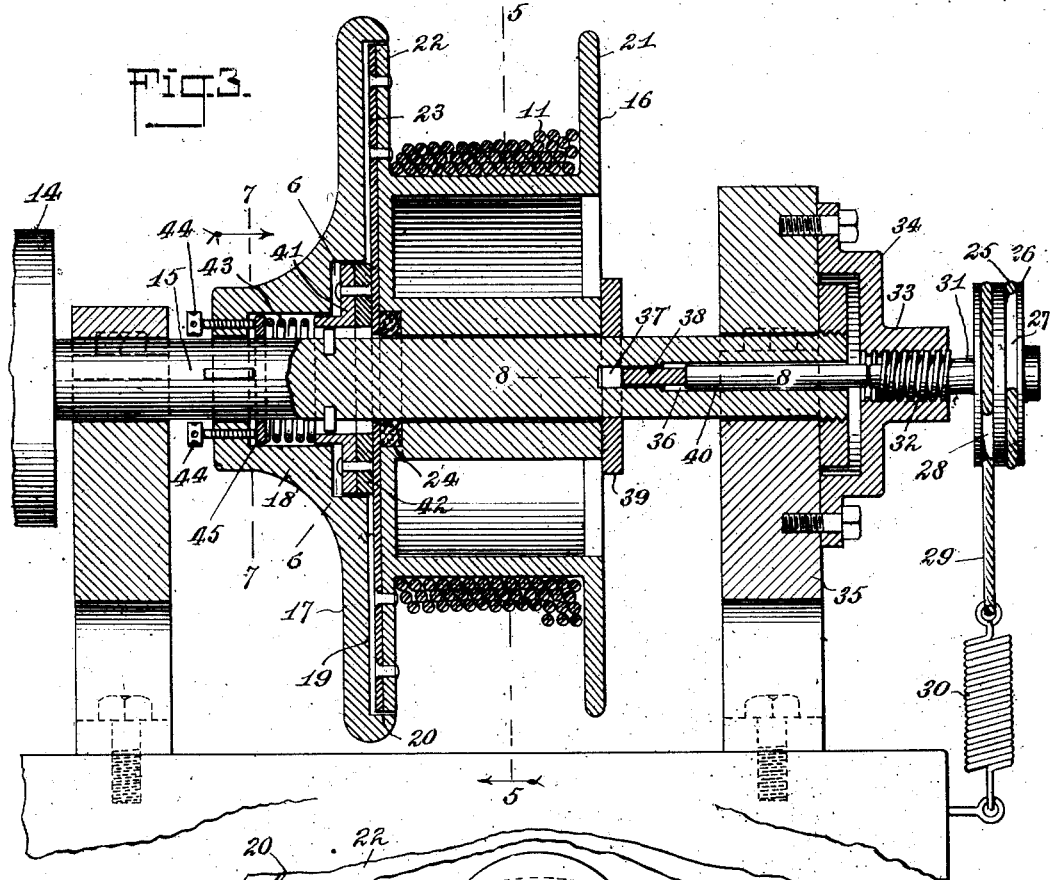
Figure 3 is an enlarged sectional view through Figure 1, approximately on line 3—3.
Figure 4:
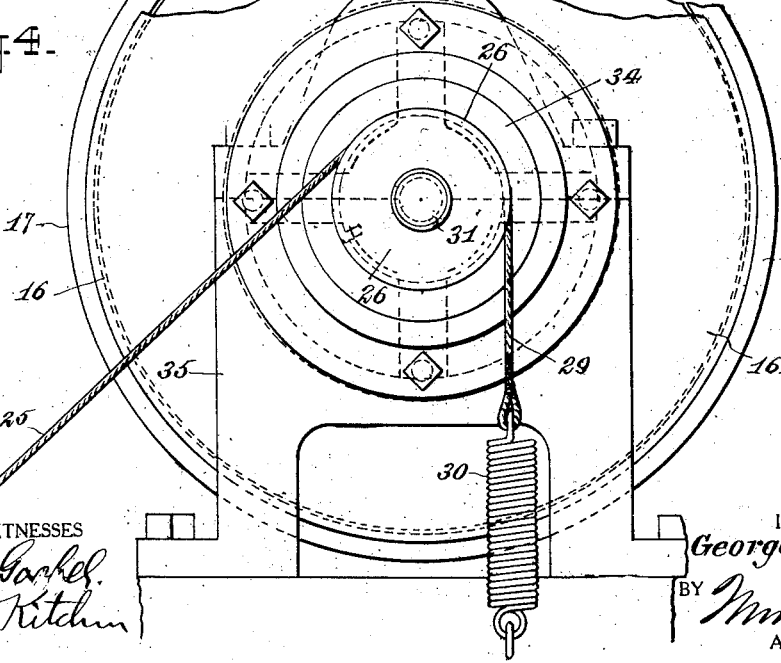
Figure 4 is an end view of the structure shown in Figure 3.

Referring to the accompanying drawings by numerals, 1 indicates a power shovel of any desired kind carried by the beam 2 which co-acts with the boom 3. Suitable power mechanism 4 is provided for actuating the boom, beam and shovel in the usual manner. The bottom 5 of the shovel is normally held closed by a latch 6 of any desired structure, said latch being pivotally connected with a lever 7 to which a chain 8 is secured. One end of chain 8 is connected with the lever 9 which is normally held in a given possition by the spring 10. The trip cable 11 is connected to lever 9 and is adapted to pull the same a sufficient distance to release the bottom 5 when the bottom is to be tripped or opened. The power shovel structure above described is old and well known and the invention lies in the connection of the trip cable 11 as described and the co-action of the mechanism for winding and maintaining taut cable 11 hereinafter fully described.

In power shovels, steam is used in many cases but in some cases, other power is used, as for instance, gasoline engines or electric motors. Where an electric motor is used and also where an internal combustion engine is used, the same are preferably kept running and the power connected and disconnected from the shovel structure as desired.

The mechanism for tripping the cable 11 is shown particularly in Figures 3 to 8 and is preferably mounted on the floor 12 of the cab 13 of the power shovel. This mechanism is operated from a constant moving power member, as for instance, an electric motor or an internal combustion engine and the power is transmitted to the pulley 14 in any suitable manner, as for instance, by a belt. This causes the pulley 14 and shaft 15 to which it is rigidly secured, to continue to rotate. As the cable drum 16 is intended to be operated only when the bottom 5 is to be tripped, said cable is normally maintained substantially stationary while the shaft 15 continues to rotate. From Figure 3 it will be observed that the shaft 15 is keyed or otherwise rigidly secured to a friction disk 17 having a comparatively large hub 18. The disk 17 is provided with a friction base 19 and an annular overhanging shoulder 20. The drum 16 is provided with side flanges 21 and 22, flange 22 having secured thereto a friction disk 23 which might be fiber, leather or other material. Member 23 may be secured in place by rivets or otherwise as desired and substantially covers one end of the drum. A packing 24 is provided at the hub of the drum to prevent oil from passing to the friction member 23.

When it is desired to cause the drum to function, the same is moved to the left in Figure 3 until the friction disk 23 presses against the friction face 19 whereupon the drum will quickly rotate and will, consequently, pull the cable 11 and trip the shovel. As soon as this has occurred, the drum is released and the cable is allowed to pay out under certain restrictions until the bottom 5 is again closed. This lateral movement, which is longitudinally of shaft 15, is produced by pulling on the cable 25, which cable is secured to the pulley 26 and partly wound around the same. Preferably, the pulley 26 is provided with grooves 27 and 28, groove 27 accommodating the cable 25 and groove 28 accommodating a tension cable 29 which is secured at one end to the pulley 26 and at the other end to a retractile spring 30. Whenever the cable 25 is pulled, spring 30 will be stretched and some of the cable 29 wound on the pulley 26. As soon as the cable 25 is released, a reverse action immediately takes place, said action being caused by spring 30. Pulley 26 is rigidly secured to a shaft 31 which has a threaded section 32 screwed into the hub 33 of cap 34, which cap is bolted or otherwise secured to one of the journal members 35 of shaft 15. It will be noted that shaft 15 is provided with a bore 36 extending to one end of the shaft and with a slot 37, said slot accommodating the pressure plate 38 which is adapted to press against the friction plate 39 when plate 38 is moved by the reciprocating pin 40. The pin 40 extends to a position normally in contact with the inner end of shaft 31 so that when the pulley 26 is partly rotated, the screw section 32 will move shaft 31 longitudinally toward the left in Figure 3 and will pull rod 40 to the left in Figure 3 and this movement is conveyed to plates 38 and 39 and, consequently, drum 16 is moved until the friction plate 23 tightly engages the surface 19. It is, of course, evident that this engagement may be very slight or may be very firm so that the drum 16 may be driven at different speeds as desired. The rotation of the drum 16 in the manner just described will cause an appreciable pull of the cable 11 and result in the tripping of the bottom 5.

In order that this action may be performed properly, it is necessary that the cable 11 be maintained comparatively taut but allowed to pay out or be rewound according to the outward and inward movement of the shovel 1. To accomplish these results, a take up plate 41 is splined on shaft 15, said plate having a friction disk 42 riveted or otherwise rigidly secured thereto, said friction disk being constantly pressing against the friction plate 23. As the take up plate 41 is splined to shaft 15, it is constantly rotating and the amount of driving force that it will exert on the drum 16 is in proportion to the tension of the spring 43 which urges the plate 41 toward the drum. The tension of this spring is regulated by the various screws 44 which act directly on the ring 45 and said ring in turn presses against the spring. This construction gives the drum 16 a continuous tendency to rotate for winding the cable 11 but the power is not sufficient to trip the bottom 5 but is sufficient to maintain the cable 11 comparatively taut. When the shovel 1 is thrust outwardly during the operation thereof, the pull on the cable 11 will cause the drum 16 to unwind against the action of the take up plate 41 but as soon as the bucket 1 has moved inwardly so as to provide a slack in cable 11, the power exerted by the plate 41 would immediately rotate the drum and take up the slack. By this means, this slack is continually taken up so that when cable 21 is pulled for causing a positive actuation of the drum 16, said drum will quickly and without any lost motion, pull the cable 11 enough to quickly trip the bottom of the shovel. It will thus be seen that a constantly moving power member may be readily used and shaft 15 may be caused to rotate constantly while the power therefrom may be utilized whenever desired for performing the tripping operation.

In order to provide a convenient arrangement for pulling the cable 25, the lever 46 which controls the power mechanism 4, is of special construction in that it is provided with a hollow section 47 at the upper end (Figure 9) and with pins or projections 48 and 49. Pin 49 carries a guiding pulley 50 while pin 48 carries a guiding pulley 51 whereby the cable 25 is guided to the arm 52 to which it is secured. Arm 52 is normally positioned above and extends parallel with pin 48 and is secured to the pivotal member or shank 53 of the crank 54. The crank 54 is provided with a grip 55 at the outer end whereby it may be rotated to any desired extent and as it is rotated the arm 52 will ride up the inclined portion 56. This upward movement and also rotary movement will cause the cable 25 to be pulled the desired extent for manipulating the member 26 to cause a proper gripping action as heretofore fully described. Usually the desired gripping action is secured before pin 52 reaches the top of the inclined portion 56 so that merely upon releasing the grip 55 the parts will automatically resume their former position and cable 25 will be released. This structure will not in any way interfere with the usual swinging movement of lever 46 for controlling the mechanism 4 and the swinging movement of lever 46 for controlling the mechanism 4 will not function to hold the cable 25 sufficient to in any way produce the gripping action for the winding. It will be noted that even though the crank 54 was rotated until pin 52 was completely out of the inclined portion 56 on the releasing grip 55, the parts would automatically return to their former position through the action of the retracting spring 30. It will thus be noted that spring 30 really answers for two purposes, namely, to release the clutch and bring back crank 54 to its normal position.

What I claim is:

1. In a semi-automatic trip for power shovels a trip cable, a drum for said trip cable, a friction disk connected with said drum, a constantly rotating power member, spring means for normally holding said friction disk out of contact with said power member, manually actuated means for pressing said friction disk against said power member whereby said drum will be rotated and automatically actuated means for reversing the action of said manually actuated means when said manually actuated means have been released.

2. In a semi-automatic trip for power shovels a trip cable, a drum for said cable, a friction disk secured to one end of said drum, a rotatable power member positioned adjacent said friction disk, spring means for normally holding the disk away from the power member, means for rotating said power member, and manually actuated means for shifting the drum so that the disk will be in engagement with said power member whereby the drum is rotated, said spring means acting to disengage the disk from the power member when the manually actuated means has been released.

3. In a semi-automatic trip for power shovels a trip cable, a drum for said trip cable, a power disk, means for constantly rotating said power disk, spring means for normally holding the drum away from said power disk, manually actuated means for forcing the drum against said power disk whereby it will be rotated therewith and said cable wound thereon, and spring actuated means for reversing the movement of the manually actuated means when said means has been released.

4. In a semi-automatic trip for power shovels a trip cable, a winding drum therefor, a rotating power disk, a spring pressed take up plate, a constantly rotating power shaft operatively connected with said disk and said take up plate so that these members will rotate with the power shaft continually, said members being positioned to frictionally engage with the friction plate so as to cause said drum to rotate and wind said cable whenever the same is slack but allow said cable to pay out when strain is brought to bear thereon, and manually actuated means for moving said drum against said friction plate for quickly winding said cable in order to cause a tripping action.

5. In a semi-automatic trip for power shovels a trip cable, a winding drum therefor, a continually rotating power shaft on which said drum is slidingly mounted, a power friction disk rigidly secured to said shaft and rotated thereby, a take up plate splined on said shaft, spring means for causing said plate to continually frictionally engage said drum so as to give the drum a tendency to rotate, means movable longitudinally of the shaft for crowding said drum against said disk so that the disk will rotate the drum, and manually actuated rotatable means for causing said longitudinally moving means to function.

6. In a semi-automatic trip for power shovels, a trip cable, a drum for said cable, a friction disk secured to one end of said drum, a rotatable power member positioned adjacent said disk, a spring for normally holding the disk away from the power member, means for rotating said power member, manually actuated means for shifting the drum so that the disk will be engaged with said power member whereby the drum is rotated, said spring acting to disengage the disk from the power member when the manually actuated means have been released, said manually actuated means including a cable, a control lever, guiding means arranged on the control lever over which said cable is adapted to be passed, a crank rotatably mounted on said lever, and an arm extending from said crank connected with said cable, whereby when said crank is partly rotated the cable will be pulled for causing the manually actuated means to function.

GEORGE G. MORIN.